July 22, 1952  E. H. HICKLING ET AL  2,604,162
DOOR FOR VEHICLES
Filed June 15, 1949   3 Sheets-Sheet 1
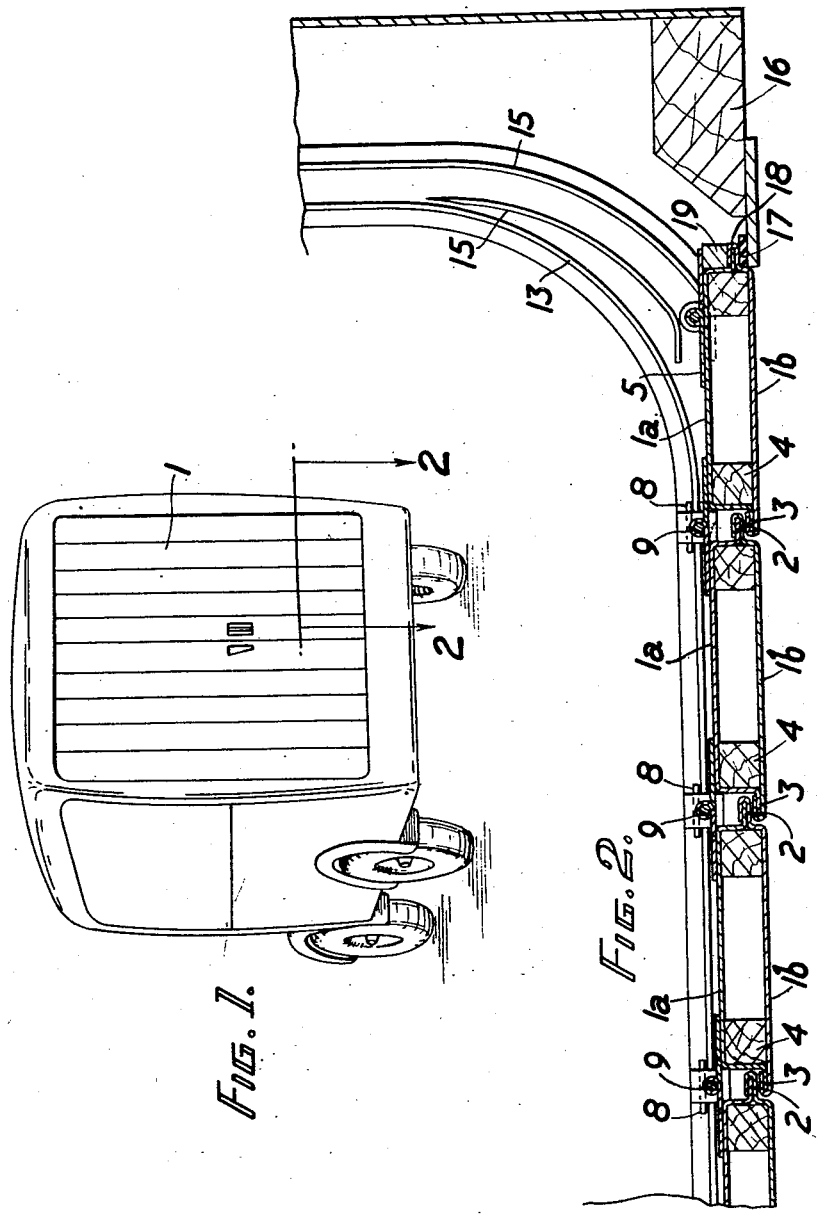
Inventors
ERNEST H. HICKLING
FRANK CHEFFINGS
WILLIAM BUTLIN
By Frederick E. Hay
Attorney

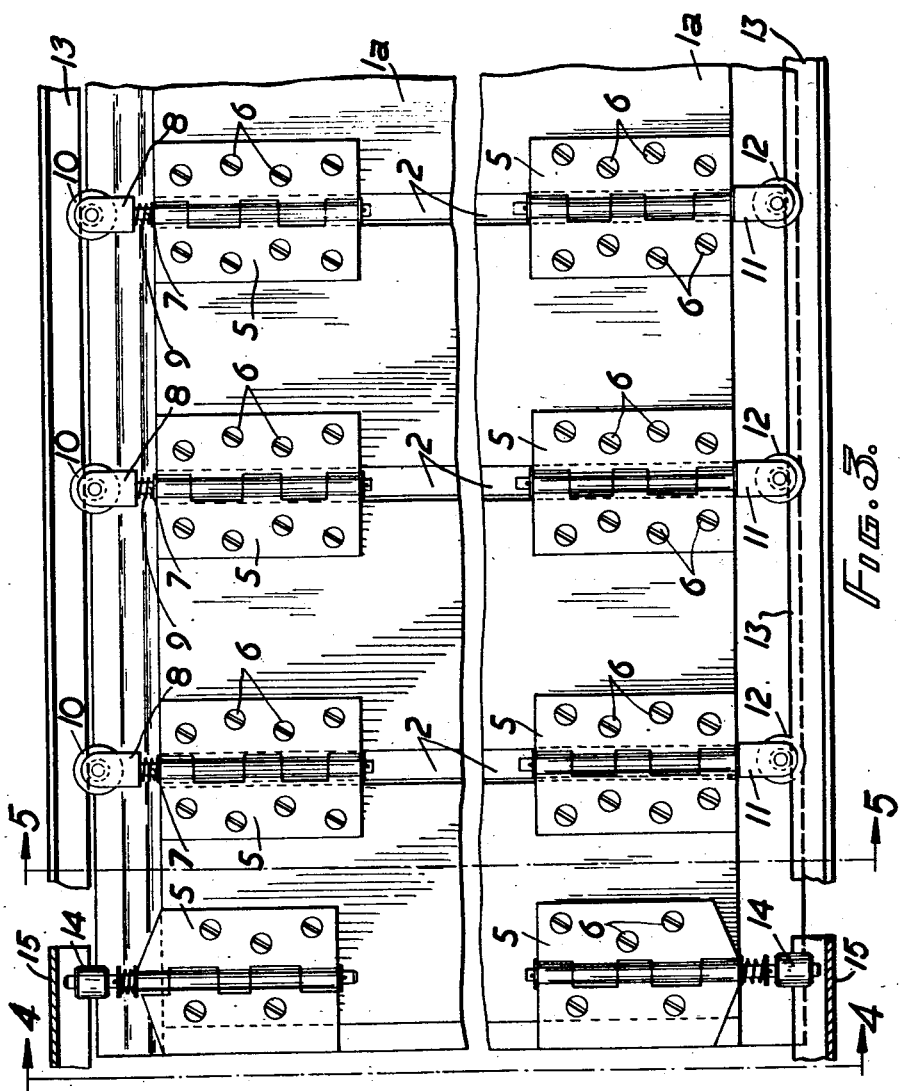

July 22, 1952  E. H. HICKLING ET AL  2,604,162
DOOR FOR VEHICLES

Filed June 15, 1949  3 Sheets-Sheet 3

INVENTORS.
ERNEST HENRY HICKLING
WILLIAM BUTLIN
FRANK CHEFFINS
BY
ATTORNEY.

Patented July 22, 1952

2,604,162

UNITED STATES PATENT OFFICE 2,604,162

DOOR FOR VEHICLES

Ernest H. Hickling, London, and Frank Cheffings and William Butlin, Greenford, England Application June 15, 1949, Serial No. 99,154
In Great Britain June 16, 1948

2 Claims. (Cl. 160—201)

This invention relates to doors for vehicles and the like and more particularly to doors for closing the open sides or rear end of a delivery van or similar vehicle and has for its object to provide an improved form of construction in which the door can be moved, either to the fully open position leaving the opening clear and unobstructed or to any intermediate position without projecting outside the vehicle body.

According to the invention there is provided a door of the type referred to comprising vertical slats or sections hingedly connected along their adjacent vertical edges, the upper and lower ends of the sections being movable along guides fixed to or mounted adjacent the roof and floor of the vehicle body and extending within at least part of adjoining body walls.

The invention will now be described with reference to the accompanying drawings which illustrate a preferred form of the invention applied to the rear end wall of a delivery vehicle and in which:

Figure 1 is a perspective view of the rear end of a vehicle showing the improved door in the closed position.

Figure 2 is a section on the line 2—2 of Figure 1.

Figure 3 is a part elevational view of the door as seen from the inside of the vehicle.

Figure 4:
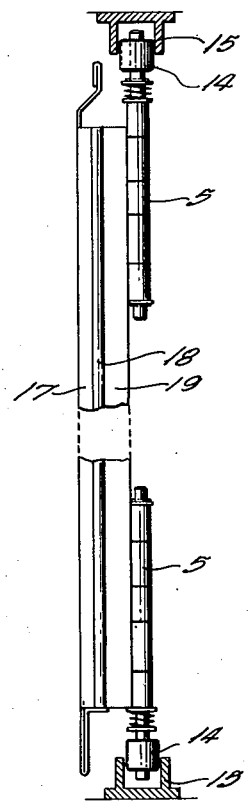
Figure 4 is a section taken along the line 4—4 of Figure 3.
Figure 5:
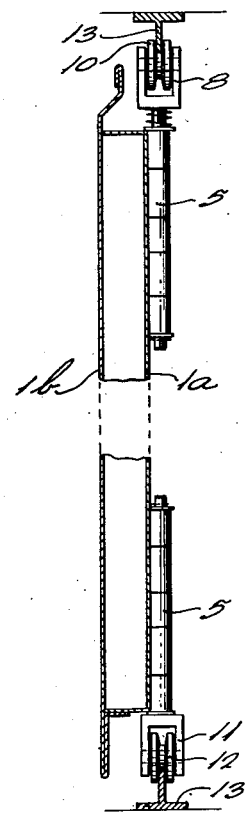
Figure 5 is a section taken on line 5—5 of Figure 3.

In the construction illustrated, each of the slats or sections 1 of the door is formed by a hollow box section of aluminium or other sheet metal measuring about five inches in width and one inch in thickness and extending substantially the full height of the door opening. The slat is built up from an inner strip 1a of flanged channel-section and a substantially flat outer strip 1b whose side margins are folded back over the outwardly projecting flanges of the inner strip as shown in Figure 2. The two end faces of the channel section strip 1a are of unequal depth and the flat outer strip 1b is cranked at one face so that in the completed slat the projecting flange 2 on one side is set back from the front surface sufficiently to allow it to lie behind the flange 3 on the other side of the adjacent slat. The inner and outer strips are separated and strengthened by wooden fillets 4 of approximately square section extending along the edges of the slat between these inner and outer strips. The adjacent slats 1 are hinged together by piano type hinges measuring some six inches in length the hinge plates 5 being secured to the rear faces of the slats by wood screws 6 which take into the wooden fillets 4.

At the upper end of the junction between adjacent slats the hinge pin 7 projects upwardly beyond the slats and forms the pivot for a U-shaped bracket 8 spaced from the slats by a spring 9 and between the arms of which there is pivotally supported a V-grooved roller 10 running on a guide track (not shown) of T-shaped or similar section secured to the upper part of the vehicle body. At the lower end of the junction between adjacent slats the hinge pin 7 projects downwardly and forms a pivot for a bracket 11 of inverted U-shape between the arms of which there is pivotally supported a roller 12 measuring about one inch in diameter and $\frac{3}{16}$ inch in width running on a guide rail 13 of inverted T section secured on or recessed into the floor of the vehicle.

The upper and lower ends of the hinge pin 7 joining terminal slats are likewise extended and function as pivots for small rollers 14 some ⅝ inch in diameter and ½ inch in width which run in channel section guides 15 secured in recesses in the vehicle body and roof respectively.

The rear corner pillar 16 of the vehicle body is bevelled to enable the slats to negotiate the curved portions of the guideways 13 and 15, and carries a projection on which there is fixed a moisture resistant weather strip 17 which abuts the flange 18 when the door is closed. A wooden batten 19 placed between the hinge plate 5 and this flange protects the slat from deformation during the action of closing the door. When the door is fully open the slats lie within the hollow rear portions of the side wall of the vehicle body.

Having now particularly described and ascertained the nature of our said invention and in what manner the same is to be performed, we declare that what we claim is:

1. A closed delivery truck having a truck body including a door opening in one of its walls, and a sectional door structure mounted slidably substantially parallel to a respective wall of the truck body for closing and uncovering said opening, said door structure comprising a plurality of elongated closed hollow sections of generally rectangular cross-section disposed side to side, respective long sides of the sections facing each other, each of said sections being composed of a pair of strips disposed parallel one to the other, one of said strips having a substantially U-shaped cross-section, one of the U-branches being shorter than the other, each of said branches ending in a flange extending parallel to the base branch of the said strip, the other of said strips having along one of its long sides a set-off flange, the other long side of the strip ending in a flange flush with the said strip, the said set-off flange being joined to the flange of said short U-branch, the said flush flange being joined to the flange of said long U-branch, thereby forming a closed hollow section of generally rectangular cross-section, the set-off flange and the flush flange of each two adjacent sections overlapping and complementing one the other, to form together with the respective strips, a substantially continuous outer door surface when said door sections are in alignment, a sealing strip disposed on the truck body wall including said opening in a position longitudinally abutting the set-off flange of the next adjacent section when the said sections are in aligned position, thereby forming a seal between the door structure and the said truck body wall, a plurality of hinge means mounted on the base branches of said U-shaped strips, each of said hinge means joining each two adjacent door sections along their respective long sides, thereby providing for movement of the sections relative one to another and to the longitudinal plane of the door structure, and a plurality of guide members provided spaced apart at the two short sides of said door sections, said truck body comprising guide tracks for said guide members mounted adjacent to respective oppostie wall edges defining said door opening, said guide tracks extending parallel to the wall including said door opening and beyond the said opening for selectively placing the door in front of said opening or parallel to a body wall portion adjacent to the door opening.

2. A delivery truck as described in claim 1, wherein the flanges of one strip of each section are bent back about the respective flanges of the second strips of the respective section, thereby joining the said strips.

ERNEST H. HICKLING.
FRANK CHEFFINGS.
WILLIAM BUTLIN.

REFERENCES CITED

The following references are of record in the file of this patent:

UNITED STATES PATENTS

| Number | Name | Date |
|---|---|---|
| 1,012,849 | Hedwall | Dec. 28, 1911 |
| 1,200,639 | Moore et al. | Oct. 10, 1916 |
| 2,075,716 | Harrison | Mar. 30, 1937 |
| 2,252,139 | Schlacter | Aug. 12, 1941 |
| 2,330,670 | Black | Sept. 28, 1943 |
| 2,391,845 | Rowe | Dec. 25, 1945 |

FOREIGN PATENTS

| Number | Country | Date |
|---|---|---|
| 302,480 | Great Britain | Dec. 20, 1933 |